Patented July 1, 1941

2,247,711

UNITED STATES PATENT OFFICE 2,247,711

STERILIZATION OF LIQUIDS

Anderson W. Ralston, Chicago, and Ervin W. Hopkins, Hinsdale, Ill., assignors to Armour and Company, Chicago, Ill., a corporation of Illinois No Drawing. Application February 12, 1940, Serial No. 318,658

6 Claims. (Cl. 210—23)

This invention relates to filter mediums and processes of sterilizing liquids; more particularly it comprises processes wherein an amine or amine salt is adsorbed upon a solid filter material and the liquid to be sterilized is passed in intimate contact with the adsorbed amine or amine salt to effect sterilization.

The sterilization of liquids for industrial or commercial uses is a major problem and the problem is one which has received a large amount of attention from scientific workers. The sterilization of any liquid presents a particular problem in itself and a process suitable for the sterilization of water may not be feasible for the sterilization of biological solutions and similar liquids. In certain instances liquids may be sterilized by heat, chlorination, etc., whereas other liquids such as egg whites could not be sterilized by this process without an undesirable modification of the original properties. One of the major aspects of this problem is the sterilization of water for domestic purposes. In most communities it is customary to sterilize water by chlorination in which process chlorine gas is passed through the water until the water contains several parts per million of dissolved chlorine. This method has certain inherent limitations which make an alternate method desirable in certain instances.

Chlorination is a process which lends itself only to large scale procedures and it must be conducted by men experienced in this work. Chlorine leaves a residual taste and odor which renders the water objectionable in certain instances. Furthermore, chlorination is not indicated for the sterilization of liquids other than water, such as milk, etc. Liquids can, of course, be sterilized by boiling but in a number of instances this is not feasible. Liquids are also sterilized by other processes such as the addition of chemicals, filtration through certain media, etc., but all of these methods have certain characteristics which render them unsatisfactory for many purposes.

It will be noted that in the processes of chemical treatment now in use or proposed it is customary to actually dissolve the chemical in the liquid so that the final product contains the chemical used in the treatment. Especially for the sterilization of foods or drinking water this is a serious disadvantage. What is desired is a process of chemical sterilization whereby the liquid is sterilized merely by contact with the chemical but the chemical does not dissolve in the liquid and thus does not appear in the final product.

We have discovered that liquids can be sterilized by placing them in intimate contact with an adsorbed high molecular weight amine or amine salt. One practical method whereby our invention can be utilized is to adsorb the primary amine or amine salt upon sand, and use this sand as a filter medium. The sand containing the adsorbed amine can be placed in a stationary container and used as a filter. Various procedures can be employed for adsorbing the amines or their salts upon the solids. When amine or amine salt solutions are agitated with solids such as sand, various silicates, carbonates such as calcium carbonate, etc., the amine or amine salt is removed from solution and adsorbed upon the solid surface. The solids can also be agitated with a suspension of amine or amine salt in water. One very convenient method is to place the solid in a container such as a filter and wash the solid with a solution or suspension of amine or amine salt. When the high molecular weight amines or amine salts are thus adsorbed on the solid particles they cannot be removed by washing with water. It has not heretofore been known that the amines could be adsorbed upon silicas or other mineral materials and when so adsorbed would retain their bacteria killing properties to provide an efficient sterilizing medium. The use of an adsorbed amine has many advantages, chief among which is the fact that the amine does not appear in the final sterilized liquids. In addition, the use of an adsorbed amine permits of a continuous process of sterilization since the filter can be placed directly in the line through which the liquid is flowing. As adsorbing media we can use sand, various silicates, zeolites and many other solid materials. In the appended claims the term "silica" is intended to include sand and any of the water insoluble silicates. In some cases it is quite advantageous to adsorb the amines or amine salts upon a zeolite since the treated zeolite would then possess its basic exchange principles as well as sterilizing properties.

The following examples show the effectiveness of amines adsorbed upon silicious materials for the sterilization of liquids.

*Example 1*

One kilo of sea sand was stirred with a solution of dodecyl amine acetate in water. The amount of dodecyl amine acetate present was the equivalent of one pound per ton of sand.

The dodecyl amine acetate present in the water was adsorbed on the sand by this treatment. The sand was then washed with a dilute solution of sodium hydroxide in order to convert the adsorbed dodecyl amine acetate to dodecyl amine. The sand was then placed in a glass cylinder so constructed that it could be used as a water filter. A sample of untreated water was obtained from Lake Michigan, inoculated with *E. coli*, and filter through the sand at such a rate that the period of contact of the water with the sand was approximately three minutes. The bacteria count upon the untreated water was 93,000 to 103,000 per cc. This count was reduced to less than one hundred by the treatment. The filter was operated for five hours at the end of which time it was still producing the same reduction in bacterial count. The water so treated contained no amine which indicates that the adsorbed amine had not been removed from the sand by the filtration.

Example 2

A filter was constructed which contained one kilo of sand which had been previously treated with the equivalent of one pound per ton of dodecyl amine. The amine salt was adsorbed upon the sand in such a manner that it was impossible to remove the amine salt by washing the sand with water. The experimental water sample was prepared by adding 1 cc. of a 24-hour broth culture of *E. coli* to 10 liters of an 0.85 percent salt solution. This sample was then filtered through the treated sand. The original bacterial count was 90,000 per cc. and this was reduced to 900 per cc. by this treatment.

Example 3

One kilo of sand was washed with two kilos of a water solution of hexadecyl amine acetate. The solution contained an amount of hexadecyl amine acetate equivalent to one pound per ton of the sand used. The sand was placed in a glass cylinder and milk passed through at the rate of five liters per hour. The original bacterial count upon the milk was 148,000 per cc. and after treatment this count was reduced to 500 per cc. The amine was not removed from the sand by this treatment.

Example 4

One kilo of a synthetic zeolite, crystallite, was treated with a water solution of dodecyl amine acetate. The amount of dodecyl amine acetate used was the equivalent of one pound per ton of the zeolite. The sand was then placed in a glass funnel and water poured into the filter at the rate of five liters per hour and allowed to filter by gravity through the sand. The water had been previously inoculated with *E. coli* and the original bacterial count was 102,000 per cc. After this treatment the bacterial count had dropped to less than one hundred per cc.

Example 5

One kilo of sand was treated with the equivalent of one pound per ton of dodecyl amine hydrochloride. The amine salt was adsorbed upon the sand as previously described. The sand was placed in a glass cylinder which served as a filter. A solution of pepsin was passed through the filter at the rate of one liter per hour. The original bacterial count of the pepsin solution was 26,000 per cc. and this count was reduced to less than 100 per cc. by this treatment.

While we have specifically referred to the use of amine and amine salts adsorbed upon silica or silicates, we can, of course, use other solid materials as the adsorbing medium. Any solid substance which is insoluble in water and which will adsorb the amines or amine salts could be used, although we prefer silica or the silicates because they are cheap and available and because they strongly adsorb amines or amine salts.

We have also confined our examples to a few specific liquids. Any liquid could, of course, be treated by our procedure. For instance it would be suitable for the sterilization of liquid egg products, for the removal of yeasts from beers, or for sterilizing cutting oils or other liquids.

We claim:

1. The process of treating liquids which comprises passing the liquid to be treated into contact with solid particles having adsorbed on their surfaces a compound chosen from the group consisting of aliphatic amines in which a hydrocarbon radical contains at least six carbon atoms and salts thereof.

2. The process of treating liquids comprising passing the liquid to be treated into contact with silica which has adsorbed on its surfaces a compound chosen from the group consisting of aliphatic amines in which a hydrocarbon radical contains at least six carbon atoms and salts thereof.

3. The process of treating liquids comprising passing the liquid to be treated into contact with solid particles having adsorbed on their surfaces dodecyl amine.

4. The process of treating liquids which comprises passing the liquid to be treated into contact with solid particles having adsorbed on their surfaces a dodecyl amine salt.

5. The process as in claim 1 wherein the liquid to be treated is an aqueous liquid.

6. A medium for the sterilization of liquids comprising solid particles having adsorbed on their surfaces a compound chosen from the group consisting of aliphatic amines in which a hydrocarbon radical contains at least six carbon atoms and salts thereof.

ANDERSON W. RALSTON.
ERVIN W. HOPKINS.